United States Patent
Kwon et al.

(10) Patent No.: US 10,957,308 B2
(45) Date of Patent: Mar. 23, 2021

(54) DEVICE AND METHOD TO PERSONALIZE SPEECH RECOGNITION MODEL

(71) Applicant: Samsung Electronics Co., Ltd., Suwon-si (KR)

(72) Inventors: Ki Soo Kwon, Seoul (KR); Inchul Song, Suwon-si (KR); YoungSang Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 16/118,807

(22) Filed: Aug. 31, 2018

(65) Prior Publication Data

US 2019/0348023 A1 Nov. 14, 2019

(30) Foreign Application Priority Data

May 11, 2018 (KR) .................... 10-2018-0054448

(51) Int. Cl.
| | |
|---|---|
| *G10L 15/07* | (2013.01) |
| *G10L 15/16* | (2006.01) |
| *G10L 15/00* | (2013.01) |
| *G10L 15/06* | (2013.01) |
| *G10L 15/183* | (2013.01) |
| *G10L 15/22* | (2006.01) |
| *G10L 15/30* | (2013.01) |

(52) U.S. Cl.
CPC ............ *G10L 15/07* (2013.01); *G10L 15/005* (2013.01); *G10L 15/063* (2013.01); *G10L 15/183* (2013.01); *G10L 15/22* (2013.01); *G10L 15/30* (2013.01); *G10L 2015/0635* (2013.01)

(58) Field of Classification Search
CPC ......... G10L 15/00; G10L 15/07; G10L 15/16; G10L 15/065

See application file for complete search history.

(56) References Cited

U.S. PATENT DOCUMENTS

| | | | |
|---|---|---|---|
| 9,672,816 B1 | 6/2017 | Chechik | |
| 9,812,122 B2 | 11/2017 | Kurata et al. | |
| 10,032,463 B1* | 7/2018 | Rastrow | ................ G10L 15/183 |
| 2012/0072215 A1* | 3/2012 | Yu | ........................ G06K 9/6296 |
| | | | 704/240 |

(Continued)

FOREIGN PATENT DOCUMENTS

| | | |
|---|---|---|
| JP | 9-258790 A | 10/1997 |
| JP | 2018-13722 A | 1/2011 |

(Continued)

OTHER PUBLICATIONS

Tan, Tian et al., "Cluster Adaptive Training for Deep Neural Network", *2015 IEEE International Conference on Acoustics, Speech and Signal Processing (ICASSP)*, 2015, (pp. 4325-4329).

(Continued)

*Primary Examiner* — Shreyans A Patel

(74) *Attorney, Agent, or Firm* — NSIP Law

(57) ABSTRACT

Provided is a method and device to personalize a speech recognition model, the device that personalizes a speech recognition model by identifying a language group corresponding to a user, and generating a personalized speech recognition model by applying a group scale matrix corresponding to the identified language group to at least a layer of a speech recognition model.

23 Claims, 10 Drawing Sheets

(56) References Cited

U.S. PATENT DOCUMENTS

| | | | | |
|---|---|---|---|---|
| 2015/0032449 A1* | 1/2015 | Sainath | ............... | G10L 15/16 704/235 |
| 2015/0127342 A1* | 5/2015 | Sharifi | ............... | G10L 17/005 704/239 |
| 2016/0203828 A1* | 7/2016 | Gomez | ............... | G10L 15/20 704/226 |
| 2016/0284347 A1* | 9/2016 | Sainath | ............... | G06N 3/0445 |
| 2017/0161256 A1* | 6/2017 | Hori | ............... | G06F 40/35 |
| 2018/0052842 A1* | 2/2018 | Hewavitharana | ..... | G06F 40/232 |
| 2018/0166066 A1* | 6/2018 | Dimitriadis | ............ | G10L 15/04 |
| 2019/0088251 A1* | 3/2019 | Mun | ............... | G10L 15/063 |
| 2019/0348023 A1* | 11/2019 | Kwon | ............... | G10L 15/07 |

FOREIGN PATENT DOCUMENTS

| | | |
|---|---|---|
| JP | 5777178 B2 | 9/2015 |
| JP | 2016-188944 A | 11/2016 |
| JP | 2017-32839 A | 2/2017 |
| KR | 10-2017-0009338 A | 1/2017 |
| KR | 10-2017-0022445 A | 3/2017 |
| KR | 10-2017-0053525 A | 5/2017 |
| KR | 10-1624926 B1 | 1/2018 |

OTHER PUBLICATIONS

Delcroix, Marc et al., "Context Adaptive Deep Neural Networks for Fast Acoustic Model Adaptation", *2015 IEEE International Conference on Acoustics, Speech and Signal Processing (ICASSP)*, 2015 (pp. 4535-4539).

Tan, Tian et al., "Cluster Adaptive Training for Deep Neural Network Based Acoustic Model", *IEEE/ACM Transactions on Audio, Speech, and Language Processing*, vol. 24, Issue 3, Mar. 2016 (pp. 459-468).

Chu, Wei, et al., "Speaker Cluster-Based Speaker Adaptive Training for Deep Neural Network Acoustic Modeling", *2016 IEEE International Conference on Acoustics, Speech and Signal Processing (ICASSP)*, Apr. 16, 2016 (5 pages in English).

Delcroix, Marc et al., "Context Adaptive Deep Neural Networks for Fast Acoustic Model Adaptation in Noisy Conditions", *2016 IEEE International Conference on Acoustics, Speech and Signal Processing (ICASSP)*, 2016, (pp. 5270-5274).

Delcroix, Marc, et al., "Context Adaptive Neural Network for Rapid Adaptation of Deep CNN Based Acoustic Models", INTERSPEECH, San Francisco, Sep. 8-12, 2016 (pp. 1573-1577).

Extended European Search Report dated Jan. 3, 2019 for the corresponding European Patent Application No. 18197986.5 (11 pages in English).

Swietojanski, Pawel et al., "SAT-LHUC: Speaker Adaptive Training for Learning Hidden Unit Contributions", *2016 IEEE International Conference on Acoustics, Speech and Signal Processing (ICASSP)*, Mar. 20, 2016 (pp. 5010-5014).

Swietojanski, Pawel et al., "Learning Hidden Unit Contributions for Unsupervised Acoustic Model Adaptation", *IEEE/ACM Transactions on Audio, Speech, and Language Processing*, vol. 24, No. 8, Jul. 13, 2016 (pp. 1-14).

* cited by examiner

Frame

DEVICE AND METHOD TO PERSONALIZE SPEECH RECOGNITION MODEL

CROSS-REFERENCE TO RELATED APPLICATIONS

This application claims the benefit under 35 USC § 119(a) of Korean Patent Application No. 10-2018-0054448 filed on May 11, 2018 in the Korean Intellectual Property Office, the entire disclosure of which is incorporated herein by reference for all purposes.

BACKGROUND

1. Field

The following description relates to technology that personalizes a speech recognition model.

2. Description of Related Art

Speech recognition is a process of converting language information included in the speech input into text information corresponding to the speech input. A speech recognition model assists in speech recognition. The speech recognition model recognizes a speech input to a device and outputs a speech recognition result. The speech recognition model estimates text information indicated by the language information included in the speech input by analyzing the speech input. The speech input has a form of speech sequence.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method to personalize a speech recognition model, the method including identifying a language group corresponding to a user, and generating a personalized speech recognition model by applying a group scale matrix corresponding to the identified language group to one or more layers of a speech recognition model.

The identifying may include identifying the language group of the user based on any one or any combination of a user input, position information, and language characteristic estimation information associated with the user.

The identifying may include identifying language groups corresponding to the user, and the generating may include applying group scale matrices corresponding to the language groups to the one or more layers of the speech recognition model.

The applying of the group scale matrices may include applying the group scale matrices corresponding to the language groups to the one or more layers sequentially based on hierarchical positions of each of the language groups.

The applying of the group scale matrices may include applying a first portion of the group scale matrices corresponding to a first portion of the language groups to the one or more layers, and applying a second portion of the group scale matrices corresponding to a second portion of the language groups to other layers of the speech recognition model.

The generating may include generating the personalized speech recognition model by applying the group scale matrix and a user scale matrix to the one or more layers.

The method may include training the user scale matrix in the personalized speech recognition model based on a speech signal, in response to the speech signal being obtained from the user, and fixing at least one parameter while training the user scale matrix.

The method may include updating the user scale matrix, in response to the group scale matrix of the personalized speech recognition model being changed.

The method may include setting an initial value of the user scale matrix to be equal to a value of the group scale matrix.

The generating may include correcting outputs of nodes included in the one or more layers by applying the group scale matrix to the outputs of the nodes in the one or more layers, and forwarding the corrected outputs to a subsequent layer.

The identifying may include identifying a language group corresponding to a current user, in response to the current user being different from a previous user.

The identifying of the language group corresponding to the current user may include loading a portion of group scale matrices on a language group to which the previous user belongs, and the generating may include generating the personalized speech recognition model by applying the loaded portion of the group scale matrices to the speech recognition model.

The method may include recognizing a speech input of the user based on the personalized speech recognition model.

The method may include identifying an additional language group corresponding to the user after the personalized speech recognition model is generated, and updating the personalized speech recognition model by applying an additional group scale matrix corresponding to the additional language group to the one or more layers.

The method may include collecting training data from a plurality of users corresponding to a target language group among language groups for a period of time, and training a group scale matrix corresponding to the target language group based on the training data.

The training may include training a group scale matrix of a higher hierarchical level than the group scale matrix corresponding to the target language group.

The generating may include limiting each of outputs of the at least a portion of the layers to which the group scale matrix is applied to a range.

The one or more layers may include a layer designated for a language of the user, among layers of the speech recognition model.

The generating may include applying the group scale matrix to a layer to which the group scale matrix is applied with respect to a previous user, in response to the previous user being identical to a current user.

The language group may include any one or any combination of a ethnic-based group, region-based group, age-based group, dialect-based group, and gender-based group.

In another general aspect, there is provided a device to personalize a speech recognition model, the device including, a processor configured to identify a language group corresponding to a user, and generate a personalized speech recognition model by applying a group scale matrix corresponding to the identified language group to one or more layers of a speech recognition model.

In another general aspect, there is provided an electronic device, including a sensor configured to sense a voice signal, a memory configured to store a personalized speech recognition model and instructions, and a processor configured to execute the instructions to identify a language group corresponding to a user, generate the personalized speech recognition model by applying a group scale matrix corresponding to the identified language group to one or more layers of a speech recognition model, recognize the voice signal based on the personalized speech recognition model, and generate a textual string based on the recognized voice signal.

The sensor may be configured to detect position information a user, the memory may be configured to store the positional information, and the processor may be configured to periodically update the personalized speech recognition model based on the stored positional information.

Other features and aspects will be apparent from the following detailed description, the drawings, and the claims.

Figure 1:
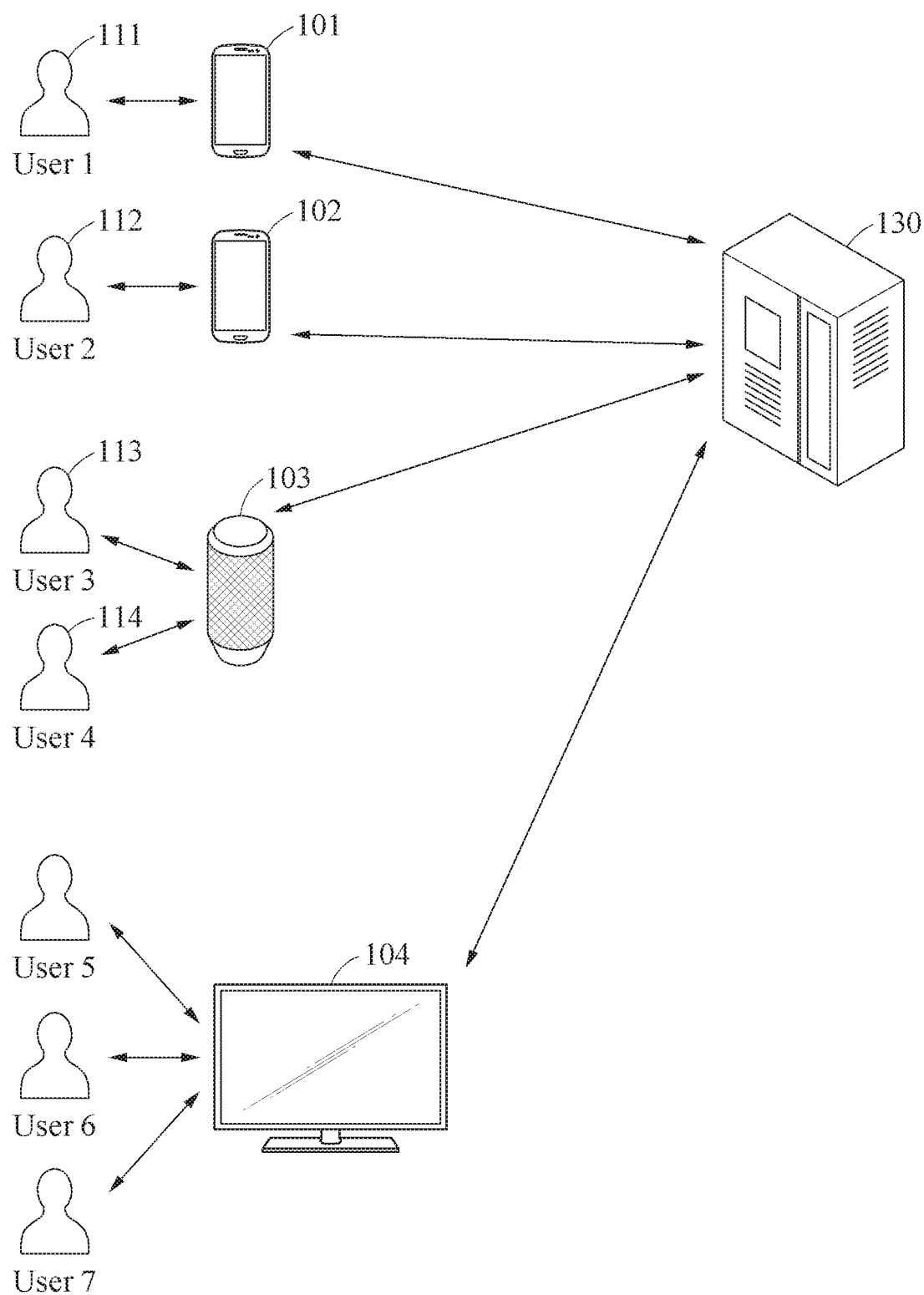
FIG. 1 illustrates an example of a personalized speech recognition apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. As used herein, the singular forms "a", "an", and "the" are intended to include the plural forms as well, unless the context clearly indicates otherwise. As used herein, the singular forms are intended to include the plural forms as well, unless the context clearly indicates otherwise. As used herein, the term "and/or" includes any one and any combination of any two or more of the associated listed items.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure. It will be understood that when a component is referred to as being "connected to" another component, the component can be directly connected or coupled to the other component or intervening components may be present.

The use of the term 'may' herein with respect to an example or embodiment, e.g., as to what an example or embodiment may include or implement, means that at least one example or embodiment exists where such a feature is included or implemented while all examples and embodiments are not limited thereto.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

FIG. 1 illustrates an example of a personalized speech recognition apparatus.

Referring to FIG. 1, in an example, a speech recognition apparatus includes a speech recognition device and a speech recognition server 130.

The speech recognition device is a device that collects sounds from around the device and obtains a speech signal which is a digital electrical signal from the sounds that it collected. For example, the speech recognition device collects sounds produced by a person speaking near the speech recognition device. In an example, the speech recognition device distinguishes a speech of a user who owns the corresponding device from the sounds around the device.

The speech recognition device is an electronic device owned by individual users such as, 111 and 112, and includes, for example, a smart phone 101, a smart pad 102, a wearable device such as a smart band, a personal digital assistant (PDA), and a laptop. In another example, the speech recognition device is an electronic device shared by a plurality of users, for example, a third user 113 and a fourth user 114, and includes, for example, a speech recognition speaker 103 and a speech recognition TV 104.

The speech recognition apparatus recognizes a speech of the user. Herein, speech recognition refers to an operation of distinguishing a speech of a user included in a sound signal and converting the speech into a language. In an example, speech recognition converts the speech of the user into text.

The speech recognition server 130 recognizes a speech signal and generates text data corresponding to the speech signal. The speech recognition server 130 receives the speech signal of the user from the speech recognition device and generates the text data corresponding to the speech signal based on the received speech signal. The speech recognition server 130 transmits the text data converted from the speech signal to the speech recognition device. In an example, the text data generated by the speech recognition server 130 is utilized for various services to be provided to the user of the speech recognition device.

For example, in FIG. 1, a first terminal 101 is an electronic device personalized by a first user 111, and a second terminal 102 is an electronic device personalized by a second user 112. The first terminal 101 collects a speech signal including an instruction to make a call to the second terminal 102 of the second user 112 from the first user 111. The speech recognition server 130 receives the speech signal including the instruction of the first user 111 from the first terminal 101. The speech recognition server 130 obtains text data corresponding to the instruction of the first user 111 from the speech signal. The speech recognition server 130 transmits the obtained text data to the first terminal 101. In response to reception of the text data recognized from the speech of the first user 111, the first terminal 101 executes a call application and controls the call application to make a call to the second user 112.

In another example, the speech recognition device provides a service of generating a schedule of the user of the corresponding device, searching for data of a web service, sending a text message, or retrieving data stored in the corresponding device based on the text data recognized by the speech recognition server 130. In an example, the text data generated by the speech recognition server 130 is displayed on the corresponding device of the user.

Hereinafter, an operation of the speech recognition system training a personalization layer with respect to a grouped common utterance characteristic of an individual user or recognizing a speech signal using personalized training will be described.

However, operations of the speech recognition device and the speech recognition server 130 are not limited to the description provided above. The speech recognition device may collect a speech signal and recognize the corresponding speech signal autonomously.

Figure 2:
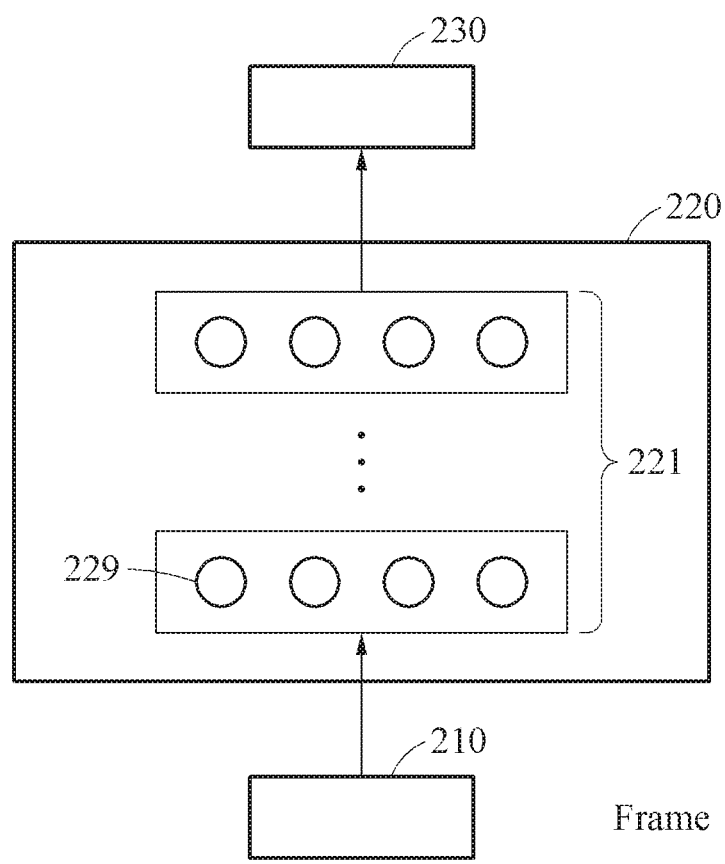
FIG. 2 illustrates an example of a speech recognition model.

FIG. 2 illustrates an example of a speech recognition model.

The speech recognition apparatus of FIG. 1 uses a speech recognition model 220. The speech recognition model 220 is a model designed to output text data from a speech signal. In an example, the speech recognition model 220 includes an acoustic model and a language model. Herein, an example in which a speech recognition server stores the speech recognition model 220 and generates text data from a speech signal based on the speech recognition model 220 will be described. For example, a speech recognition device transmits a speech signal or feature data converted from the speech signal to the speech recognition server, and the speech recognition server performs speech recognition based on the received information. However, examples are not limited thereto. The speech recognition device may autonomously store the speech recognition model 220 and recognize a speech of a user using the stored speech recognition model 220.

The acoustic model is a model that recognizes a speech signal in phoneme units from features extracted from the speech signal. For example, the speech recognition apparatus estimates words represented by the speech signal based on a result of recognizing the obtained speech signal in the phoneme units by the acoustic model.

The language model is a model designed to obtain probability information based on a connection relation between words. The language model provides probability information related to a subsequent word to follow a word input into the language model. For example, in a case in which a word "this" is input into the language model, the language model provides probability information of "is" or "was" to follow "this". In an example, the speech recognition apparatus selects a highest-probability connection relation between words based on the probability information provided by the language model, and outputs a result of the selection as a speech recognition result.

Hereinafter, an operation associated with the acoustic model of the speech recognition model 220 is described. The acoustic model is implemented as a neural network, for example, in various structures such as a Gaussian mixture model (GMM), a deep neural network (DNN) or an n-layer neural network, and a bidirectional long short-term memory (BLSTM). The DNN or n-layer neural network may correspond to a convolutional neural network (CNN), a recurrent neural network (RNN), a deep belief network, a fully connected network, a bi-directional neural network, or a restricted Boltzman machine, or may include different or overlapping neural network portions respectively with full, convolutional, recurrent, and/or bi-directional connections. A machine learning structure as which the acoustic model is implemented is not limited thereto, and the acoustic model may be implemented in a form of combination of one or more of the structures of the GMM, DNN, and the BLSTM. The neural network is a recognition model implemented on hardware comprising neurons or nodes.

The neural network includes a plurality of layers. For example, the neural network includes an input layer, at least one hidden layer 221, and an output layer. The input layer receives input data and transmits the input data to the hidden layer 221, and the output layer generates output data based on signals received from nodes of the hidden layer 221. In an example, the neural network has a structure having a plurality of layers including an input, feature maps, and an output. In the neural network, a convolution operation is performed on the input source sentence with a filter referred to as a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be finally output through the neural network.

The at least one hidden layer 221 is disposed between the input layer and the output layer, and the speech recognition apparatus converts the input data into easily predictable values through the hidden layer 221. Nodes included in the input layer and the at least one hidden layer 221 are connected to each other through edges having connection weights, and nodes included in the hidden layer 221 and the output layer are also connected to each other through edges having connection weights. Among neural networks, a neural network including a plurality of hidden layers 221 is referred to as a DNN. Training the DNN is referred to as deep learning. Among nodes of the neural network, a node included in the the hidden layer 221 is referred to as a hidden node 229.

The input layer, the at least one hidden layer 221, and the output layer include a plurality of nodes. The hidden layer 221 is a convolution filter or a fully connected layer in a convolutional neural network (CNN), or various types of filters or layers bound based on special functions or features.

The acoustic model is implemented, for example, as a recurrent neural network (RNN). The RNN is a network in which an output value of the hidden layer 221 of a previous frame is input again into the hidden layer 221 of a current frame. In the RNN, previous outputs affect a computation result of a new output.

The speech recognition apparatus divides a speech sequence 201 into a plurality of frames and predicts an utterance corresponding to each of the frames. The speech recognition apparatus performs speech recognition using the acoustic model, and the acoustic model includes the input layer, the hidden layer 221, and the output layer. The output layer outputs an utterance result 230 predicted with respect to a frame 210 input into the input layer. For example, the speech recognition device or the speech recognition server inputs outputs of previous hidden nodes 229 included in a previous hidden layer into each hidden layer 221 through edges having connection weights, and generates outputs of the hidden nodes 229 included in the hidden layer 221 based on values obtained by applying the connection weights to the outputs of the previous hidden nodes 229 and activation functions. In an example, when a result of the activation functions exceeds a threshold value of a current hidden node, the output is sent as an input to a subsequent hidden node. In this example, a node maintains a deactivated state without firing a signal to a subsequent node until a threshold strength of activation is reached through input vectors.

The output layer is a softmax layer. The output layer includes the same number of nodes as the total number of utterances. Each node of the output layer represents a probability of the input frame 210 corresponding to an utterance.

In comparison with conventional neural network apparatuses, the neural network apparatus disclosed herein quickly and efficiently processes a convolution operation in a neural network to personalize a speech recognition model by identifying a language group corresponding to a current user each time the user is changed. The neural network apparatus disclosed herein quickly and efficiently processes a convolution operation in a neural network to identify the language group of the user based on language characteristic estimation information associated with the user. Thus, making optimal use of available hardware resources for speech recognition.

Hereinafter, an operation of personalizing a speech recognition model will be described. Herein, a device to personalize a speech recognition model is the speech recognition server or the speech recognition device.

Figure 3:
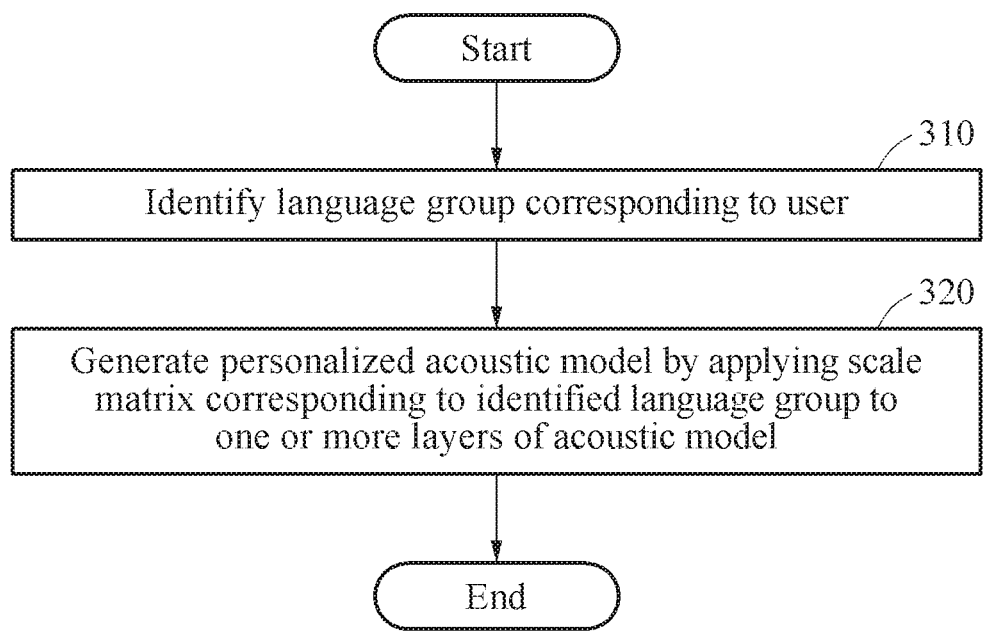
FIG. 3 is a diagram illustrating an example of a method to personalize a speech recognition model.

FIG. 3 is a diagram illustrating an example of a method to personalize a speech recognition model. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, in operation 310, a device to personalize a speech recognition model identifies a language group corresponding to a user. The language group is a group classified based on a language characteristic with respect to a language. With respect to the same language, language groups are classified by ethnic group, region, or gender. For example, with respect to Korean language, language groups classified by ethnic group include a Korean group and a foreigner group. Language groups classified by region include a Seoul group, a Jeolla group, and a Gyeonsang group, and the language groups classified by region represent dialects of corresponding regions. Language groups classified by gender include a male group and a female group. Language groups by environment include an indoor group and an outdoor group. Language groups by age include groups of ages of users, for example, a teenager group, a twenties group, a middle-ager group. However, the language groups described above are merely provided as examples, and variations may be made thereto according to design. Further, each language group is classified hierarchically, and a hierarchical level of the language group will be described in detail with reference to FIG. 4.

In operation 320, the device to personalize a speech recognition model generates a personalized acoustic model by applying a group scale matrix corresponding to the identified language group to one or more layers of the acoustic model.

The acoustic model is a model trained based on training data. For example, the training data includes pairs of speeches of various people and corresponding labels. The acoustic model is a model that has not been personalized. The acoustic model is a global model trained with general utterance characteristics that all people have, and may also be referred to as a user independent acoustic model.

The personalized acoustic model is a model to which a scale matrix is applied. Application of the scale matrix will be described in detail with reference to FIG. 5. In an example, the scale matrix includes a group scale matrix representing a characteristic of a language group and a user scale matrix representing a characteristic of a user. For example, the device personalizes the speech recognition model by applying a group scale matrix corresponding to a language group to which the user belongs to the speech recognition model. Further, the device further personalizes the speech recognition model by additionally applying a user scale matrix optimized to the corresponding user to the speech recognition model.

In an example, the device to personalize a speech recognition model identifies a language group corresponding to a current user in response to the current user being different from a previous user. For example, an artificial intelligence (AI) speaker receives speeches of several users, and the device to personalize a speech recognition model identifies a language group corresponding to a current user each time the user is changed.

Further, the device to personalize a speech recognition model loads a portion of a plurality of group scale matrices on a language group to which the previous user belongs. The device to personalize a speech recognition model generates the personalized speech recognition model by applying the loaded portion of the group scale matrices to the speech recognition model. For example, the device to personalize a speech recognition model loads and uses only a group scale vector corresponding to a common language characteristic between the previous user and the current user.

The device to personalize a speech recognition model applies the group scale matrix to a layer to which the group scale matrix is applied with respect to the previous user when the previous user is identical to the current user.

The device to personalize a speech recognition model recognizes a speech input of the user based on the personalized speech recognition model.

Figure 4:
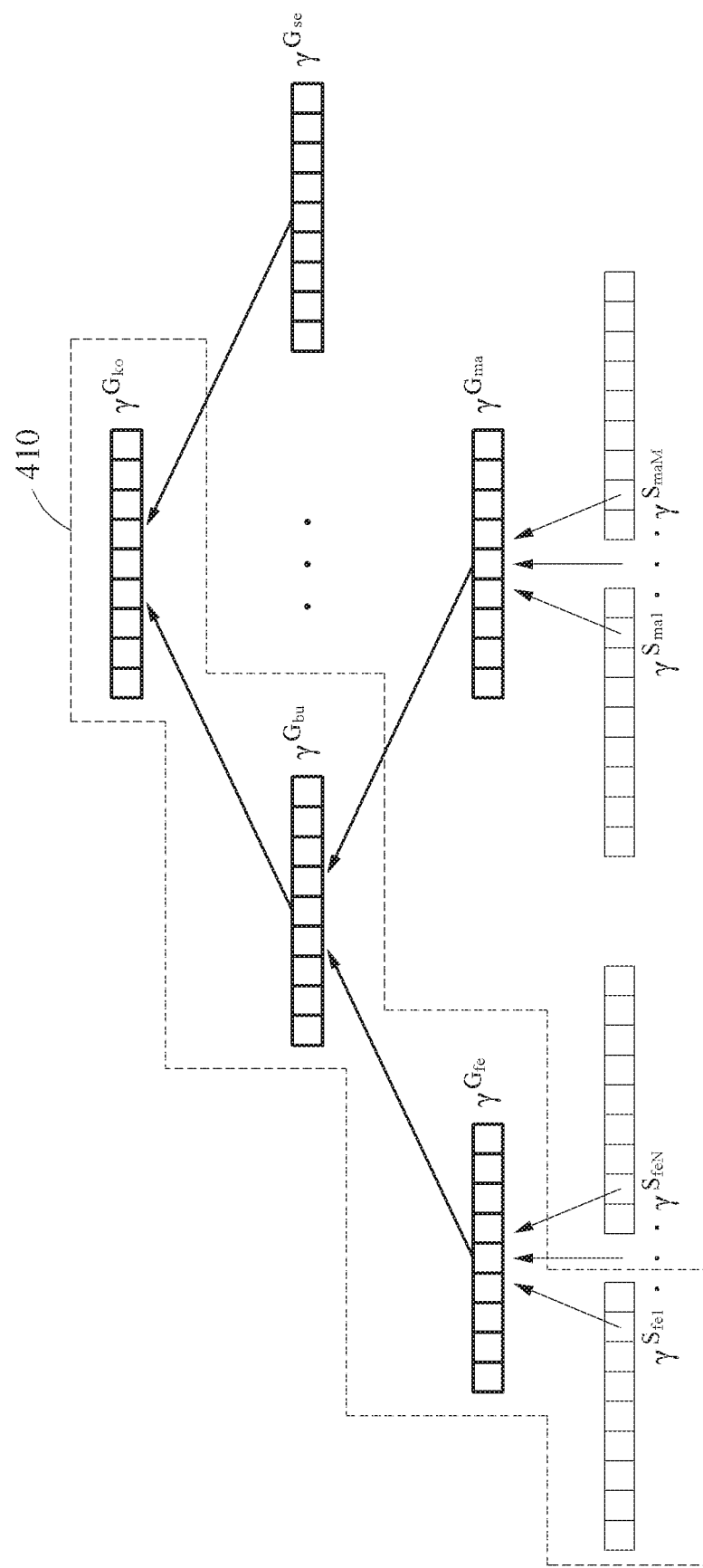
FIG. 4 illustrates an example of hierarchically configured language groups.

FIG. 4 illustrates an example of hierarchically configured language groups.

A language is classified into various language groups based on language characteristics that are common to a plurality of users. As described above, the languages groups are classified based on various criteria such as, for example an ethnic group, a region, a gender, an age, and an environment. Further, each language group represents a hierarchical level, and the device to personalize a speech recognition model applies a language group based on a hierarchical position.

FIG. 4 illustrates an example of hierarchically configured language groups, and a first hierarchical level which is a top hierarchical level includes a Korean group. A group scale matrix corresponding to the Korean group is denoted as $\gamma^{Gko}$. A second hierarchical level, which is a subordinate hierarchical level of the Korean group, is classified by region and includes a Busan group and a Seoul group. A group scale matrix corresponding to the Busan group is denoted as $\gamma^{Gbu}$, and a group scale matrix corresponding to the Seoul group is denoted as $\gamma^{Gse}$. A third hierarchical level, which is a subordinate hierarchical level of the Busan group, is classified by gender and includes a female group and a male group. A group scale matrix corresponding to the female group is denoted by $\gamma^{Gfe}$, and a group scale matrix corresponding to the male group is denoted by $\gamma^{Gma}$.

A fourth hierarchical level, which is a bottom hierarchical level, represents a classification distinguished for each individual user, and the female group includes user scale matrices, for example, through $\gamma^{Sfe1}$ through $\gamma^{SfeN}$, corresponding to N women who are Korean and live in Busan, N being an integer greater than or equal to "1". The male group includes user scale matrices, for example, $\gamma^{Sma1}$ through $\gamma^{SmaM}$, corresponding to M men who are Korean and live in Busan, M being an integer greater than or equal to "1".

The device to personalize a speech recognition model identifies a language group corresponding to a user. For example, it may be assumed that a female user is Korean and lives in Busan. In FIG. 4, the device to personalize a speech recognition model identifies the Korean group, the Busan group, and the female group as language groups corresponding to the user. The device to personalize a speech recognition model determines scale matrices 410, for example, $\gamma^{Gko}$, $\gamma^{Gbu}$, $\gamma^{Gfe}$ and $\gamma^{Sfe1}$, corresponding to the identified language groups and the corresponding user.

The device to personalize a speech recognition model identifies the language group of the user based on any one or any combination of a user input, position information, and language characteristic estimation information associated with the user.

The user input is an input obtained from the user. In an example, the device to personalize a speech recognition model obtains a direct input of information associated with a language characteristic of the user from the user. In the example of FIG. 4, the device to personalize a speech recognition model obtains, from the user, an input indicating that the user is Korean, an input indicating that the user lives in Busan, and an input indicating that the user is female.

The position information is information indicating a position of the user collected by the device to personalize a speech recognition model. In the example of FIG. 4, the position information is information indicating that the user is in Busan.

The language characteristic estimation information is language characteristic information of the user estimated by the device to personalize a speech recognition model. For example, the device to personalize a speech recognition model estimates a language characteristic of the user from the obtained speech signal and identifies a language group corresponding to the estimated language characteristic. For example, the device to personalize a speech recognition model estimates an accent or a tone represented by a dialect of the user from the obtained speech signal.

In another example, the device to personalize a speech recognition model identifies a language group for a man who is English who speaks English language, lives in Liverpool, and is under 30. The device to personalize a speech recognition model identifies an English group, a Liverpool group, an under-30 group, and a male group, and determines group scale matrices corresponding to the language groups, in an acoustic model with respect to English language. In another example, the device to personalize a speech recognition model identifies a Korean group and a male group, in the acoustic model with respect to English language.

The device to personalize a speech recognition model applies the determined scale matrices, for example, the group scale matrices and the user scale matrix, to the speech recognition model, which will be described below.

Figure 5:
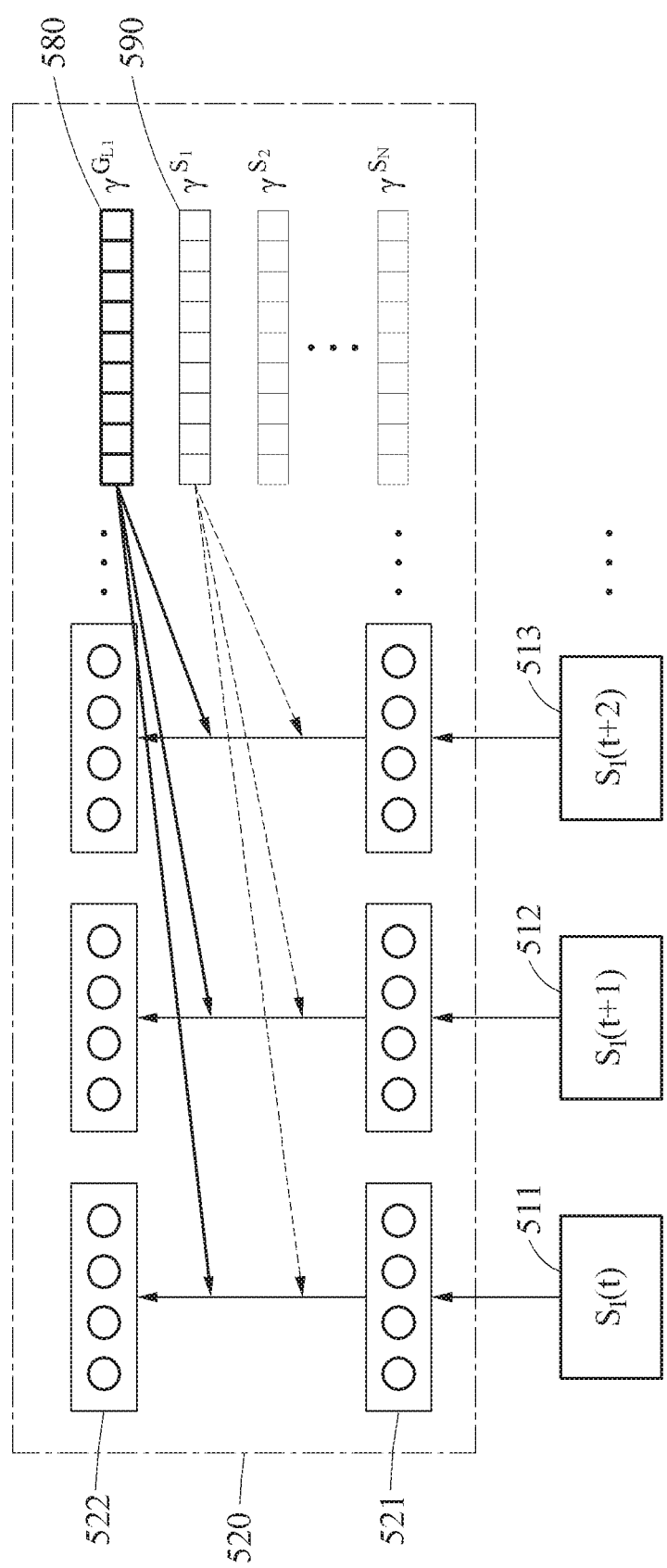
FIGS. 5 through 7 are examples of applying a scale matrix to a speech recognition model.
Figure 6:
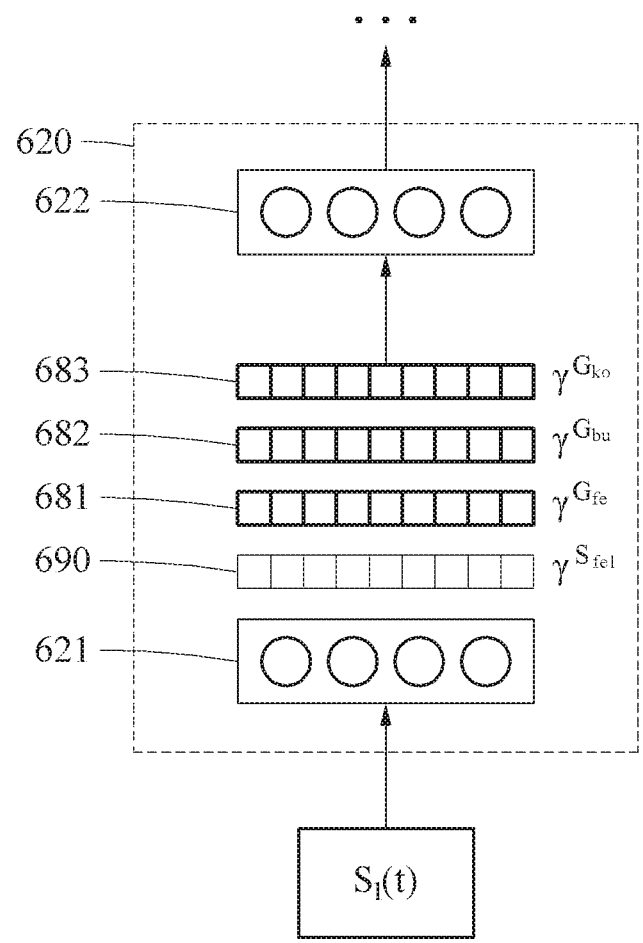
Figure 7:
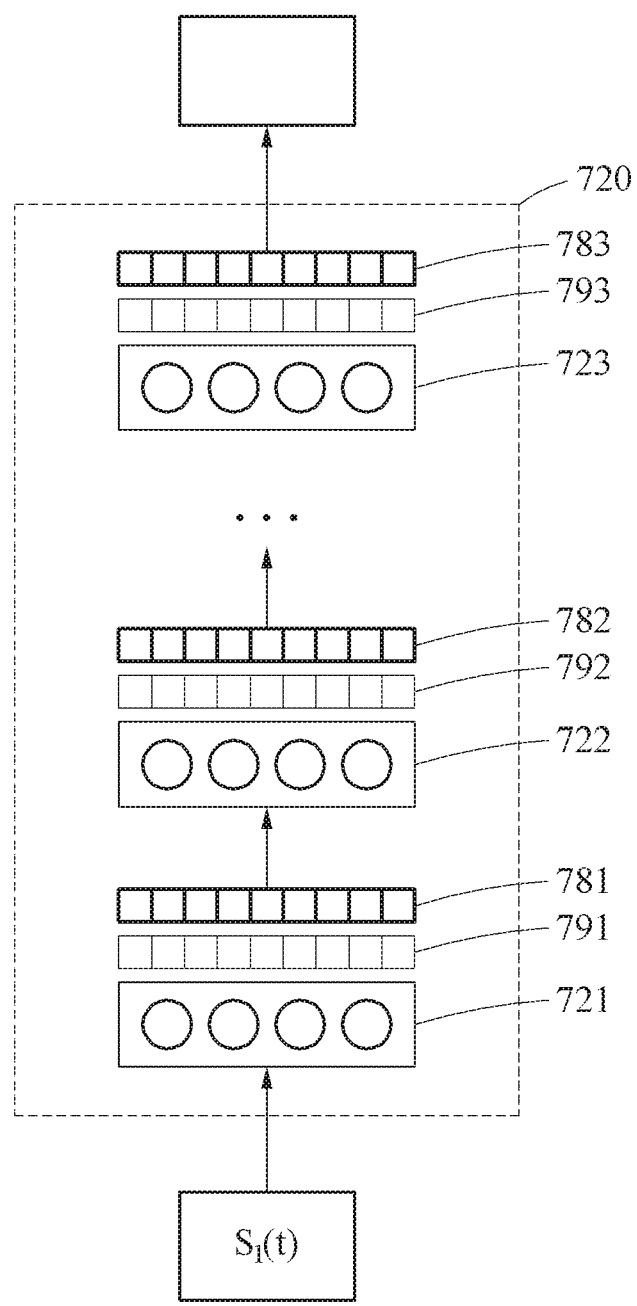

FIGS. 5 through 7 are examples of applying a scale matrix to a speech recognition model.

FIG. 5 illustrates a speech recognition model 520 having a structure in which three RNNs are stacked. For example, a device to personalize a speech recognition model inputs frame data $S_1(t)$ 511 of a time t into an RNN on the left, inputs frame data $S_1(t+1)$ 512 of a time t+1 into an RNN at the center, and inputs frame data $S_1(t+2)$ 513 of a time t+2 into an RNN on the right.

The device to personalize a speech recognition model generates a personalized speech recognition model 520 by applying a group scale matrix 580 to a layer 521 of the speech recognition model 520. For example, the device to personalize a speech recognition model corrects outputs of nodes included in one or more layers 521 by applying the group scale matrix 580 to the outputs of the nodes included in of the one or more layers 521. Further, the device to personalize a speech recognition model generates the personalized speech recognition model 520 by applying the group scale matrix 580 and a user scale matrix 590 to the one or more layers 521. The device to personalize a speech recognition model corrects outputs of hidden nodes of a hidden layer 521 by applying the user scale matrix 590 and the group scale matrix 580 to the outputs of the corresponding nodes.

First, an output of a hidden node yet to be corrected is expressed by Equation 1.

$$h_j^i = \psi_j (w_j^{i\ T} x + b_j^i) \qquad \text{[Equation 1]}$$

In Equation 1, $h_j^i$ denotes an output of a j-th hidden node in an i-th layer. $\psi_j$ denotes an activation function of the j-th hidden node. x denotes an input of a hidden node, and corresponds to, for example, an output forwarded from a node of a previous layer. For example, in speech recognition, a 1-second speech is divided into 10-ms units, and the device to personalize a speech recognition model divides the 1-second speech into 100 frames. Each frame is expressed by a vector, and in FIG. 5 the frame data 511, 512 and 513 of the three times are expressed by vectors. In a case of i=1, a hidden node of a first layer receives the frame data 511, 512 and 513 as the input x. $w_j^{i\ T}$ denotes a weigh vector to be multiplied by the input of the hidden node. $b_j^i$ denotes a bias. i and j denote integers greater than or equal to "1". Layers are disposed in an order from input to output, and for example, a closest hidden layer connected to the input layer is the first layer.

A corrected output of a hidden node to which a scale matrix is applied is expressed by Equation 2.

$$h_j^{i,G_{L1}} = A \cdot f(\gamma_j^{G_{L1}} \odot h_j^i)$$ [Equation 2]

In Equation 2, $h_j^{i,G_{L1}}$ denotes an output corrected by applying a scale matrix to the j-th hidden node in the i-th layer. $h_j^i$ denotes the output of the j-th hidden node in the i-th layer, as described above. $\gamma_j^{G_{L1}}$ denotes a group scale matrix 580 of a language group L1. $\odot$ denotes an elementwise operation, and represents, for example, a matrix product. f denotes a function to apply the scale matrix to an output of a node of a layer, and is, for example, a function to limit a range of an output value after correction. For example, f is a sigmoid function and a tan h function. A denotes a constant that limits an output range of $h_j^{i,G_{L1}}$.

Thus, the device to personalize a speech recognition model limits each of the outputs of the one or more layers 521 to which the group scale matrix 580 is applied to a range of, for example, "0" to "2".

The device to personalize a speech recognition model forwards the corrected outputs to a subsequent layer 522. The device to personalize a speech recognition model forwards outputs of nodes sequentially in layer units and generates a final output in a last layer.

The device to personalize a speech recognition model generates a result of speech recognition personalized to a user by applying a scale matrix to an output of a layer.

FIG. 6 illustrates an example of applying group scale matrices corresponding to a plurality of language groups.

A device to personalize a speech recognition model identifies a plurality of language groups corresponding to a user. The device to personalize a speech recognition model applies group scale matrices corresponding to the plurality of language groups to one or more layers 621 of a speech recognition model 620. For example, the device to personalize a speech recognition model applies the group scale matrices corresponding to the plurality of language groups to the one or more layers 621 sequentially based on hierarchical positions of the plurality of language groups.

The device to personalize a speech recognition model applies the operations of Equations 1 and 2 to each scale matrix. For example, the device to personalize a speech recognition model applies the scale matrices corresponding to the plurality of language groups as expressed by Equation 3.

$$h_j^{i,K} = A_K \cdot f_K(\gamma_j^K \odot h_j^{i,K-1})$$ [Equation 3]

In Equation 3, $h_j^{i,K}$ denotes an output generated by applying K scale matrices to a j-th hidden node in an i-th layer. $h_j^{i,K-1}$ denotes an output generated by applying K−1 scale matrices to the j-th hidden node in the i-th layer. K denotes an integer greater than or equal to "2". $\gamma_j^K$ denotes a K-th scale matrix. $f_K$ denotes a function to apply the K-th scale matrix to an output to which the K−1 scale matrices are applied. $A_K$ denotes a constant to limit a range of a corrected output of a hidden node. However, application of a plurality of scale matrices is not limited to Equation 3. Various functions may be applied thereto.

In the example FIG. 6, the device to personalize a speech recognition model identifies three language groups, for example, a Korean language group, a Busan group, and a female group, as described with reference to FIG. 4. The device to personalize a speech recognition model applies three group scale matrices 681, 682 and 683 and a user scale matrix 690 to a layer 621. In the example of FIG. 6, K of Equation 3 may be "4".

The device to personalize a speech recognition model corrects outputs of nodes included in the one or more layers 621 by applying the group scale matrices to the outputs of the nodes included in the one or more layers 621. The device to personalize a speech recognition model forwards the corrected outputs to a subsequent layer 622.

FIG. 7 illustrates an example of applying group scale matrices corresponding to a plurality of language groups.

A device to personalize a speech recognition model applies group scale matrices 791, 792 and 793 corresponding to identified language groups to layers 721, 722 and 723, respectively. The device to personalize a speech recognition model also applies user scale matrices 781, 782 and 783 to the layers 721, 722 and 723, respectively. Each group scale matrix 791, 792, 793 corresponds to the same language group, and each user scale matrix 781, 782, 783 corresponds to the same user.

In another example, the device to personalize a speech recognition model applies group scale matrices corresponding a plurality of language groups to one or more layers. The device to personalize a speech recognition model applies other group scale matrices corresponding to another portion of the plurality of language groups to other layers. For example, the device to personalize a speech recognition model applies a first group scale matrix and a first user scale matrix to a first layer and applies a second group scale matrix and a second user scale matrix to a second layer.

In another example, the device to personalize a speech recognition model applies a group scale matrix to a layer that is designated for a language of the user, among a plurality of layers of a speech recognition model. For example, in a case of a speech recognition model for Korean language, the device to personalize a speech recognition model applies scale matrices, for example, a group scale matrix and a user scale matrix, to a superordinate layer, for example, a layer adjacent to an output layer. In a case of a speech recognition model for English language, the device to personalize a speech recognition model applies scale matrices to a subordinate layer, for example, a layer adjacent to an input layer.

However, application of scale matrices is not limited thereto. According to design, scale matrices may be applied to a speech recognition model 720 in various structures.

Figure 8:
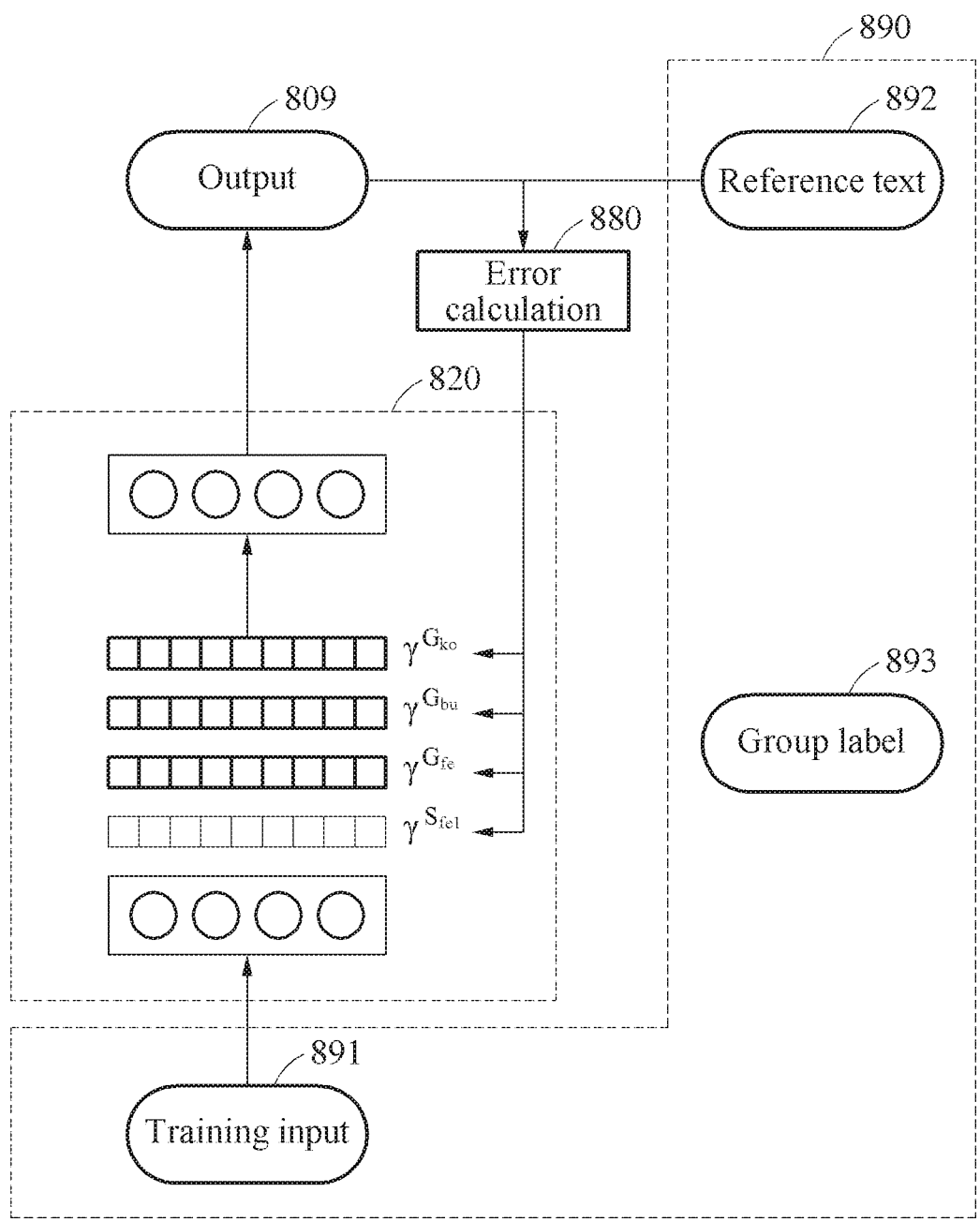
FIG. 8 illustrates an example of training a scale matrix.

FIG. 8 illustrates an example of training a scale matrix.

When a device to personalize a speech recognition model is a speech recognition server, the speech recognition server loads a group scale matrix and a user scale matrix for an individual user terminal or distributes the group scale matrix and the user scale matrix to the corresponding user terminal. The device to personalize a speech recognition model selectively loads or distributes a plurality of group scale matrices classified into a plurality of hierarchical levels, as needed. The device to personalize a speech recognition model trains the group scale matrix in advance of acquiring a speech recognition request from a user. The device to personalize a speech recognition model trains the user scale matrix after generating a speech recognition model 820 personalized for an individual user.

When generating an initial model for a user, the device to personalize a speech recognition model loads a group scale matrix corresponding to an identified language group and applies the loaded group scale matrix and a user scale matrix to the corresponding initial model. The group scale matrix applied to the initial model is a matrix trained in advance with respect to a corresponding language group based on existing training data 890. The user scale matrix applied to the initial model has an initial value before training. In an example, the initial value of the user scale matrix is set to be the same value as the group scale matrix trained in advance.

When a speech signal is acquired from the user, the device to personalize a speech recognition model trains the user scale matrix in the personalized speech recognition model 820 based on the acquired speech signal. For example, the device to personalize a speech recognition model fixes remaining parameters, for example, a weight vector and a bias, while training the user scale matrix.

When the group scale matrix of the personalized speech recognition model 820 is changed, the device to personalize a speech recognition model updates the user scale matrix. In an example, the device to personalize a speech recognition model identifies an additional language group corresponding to the user after the personalized speech recognition model 820 is generated. The device to personalize a speech recognition model updates the personalized speech recognition model 820 by additionally applying a group scale matrix corresponding to the additional language group to one or more layers. The group scale matrix belongs to a higher hierarchical level than the user scale matrix. Thus, when the group scale matrix is changed, the user scale matrix needs to be retrained.

In an example, the device to personalize a speech recognition model collects training data 890 from a plurality of users corresponding to a target language group among a plurality of language groups for a period of time. The target language group is a language group targeted for training. The device to personalize a speech recognition model trains a group scale matrix corresponding to the target language group based on the training data 890. The device to personalize a speech recognition model trains a group scale matrix of a higher hierarchical level than the group scale matrix corresponding to the target language group. A language group of a lower hierarchical level includes language characteristics corresponding to a language group of a higher hierarchical level, and thus a group scale matrix corresponding to the language group of the higher hierarchical level also needs to be trained when training the language group of the lower hierarchical level.

The device to personalize a speech recognition model generates new training data 890 based on a speech signal newly acquired from the user. The new training data 890 includes a training input 891, a reference text 892, and a group label 893. The training input 891 is the speech signal or feature data extracted from the speech signal. The reference text 892 is true text data indicated by the corresponding training input 891. The group label 893 is data indicating a group corresponding to language characteristics represented by the corresponding training input 891.

The device to personalize a speech recognition model trains the scale matrices of the speech recognition model 820 through supervised learning. Supervised learning refers to a method of inputting the training input 891 of the training data 890 and a corresponding training output, for example, the reference text 892 in FIG. 8, into the speech recognition model 820, and updating the scale matrices so that output data corresponding to the training output of the training data 890 is output.

The device to personalize a speech recognition model determine the scale matrices through a gradient descent scheme which is based on a loss to be back-propagated to a neural network and output values 809 of nodes included in the neural network. For example, the device to personalize a speech recognition model updates at least one of the group scale matrix and the user scale matrix through loss back-propagation learning. Loss back-propagation learning refers to a method of estimating a loss with respect to the provided training data 890 through forward computation, for example, performing an error calculation 880, and updating the scale matrices to reduce the loss while propagating the estimated loss in a backward direction from the output layer toward the hidden layer and the input layer.

The device to personalize a speech recognition model defines an objective function to be used to measure optimalities of currently set scale matrices, continuously changes the scale matrices based on a result of the objective function, and iteratively performs training. For example, the objective function is a loss function to be used by the neural network to calculate a loss between an actual output value 809 and a value expected to be output, for example, the reference text 892, based on the training input 891 of the training data 890. The device to personalize a speech recognition model updates the scale matrices to reduce a value of the loss function.

To reflect personalization and recent speech characteristics, the device to personalize a speech recognition model trains group scale matrices. When a speech signal of a user is input into a speech recognition model 820 of the corresponding user for personalization, the device to personalize a speech recognition model updates a user scale matrix of the corresponding user.

In an example, the device to personalize a speech recognition model periodically collects speech signals from a plurality of users and updates a group scale matrix of a higher hierarchical level than a user scale matrix. The device to personalize a speech recognition model extracts a speech signal representing a common language characteristic from the speech signals collected from the plurality of users. The device to personalize a speech recognition model trains a group scale matrix corresponding to a language group having the common language characteristic using the speech signal representing the common language characteristic.

The device to personalize a speech recognition model reflects a language characteristic according to a recent speech signal data distribution in the group scale matrix through training described above. The group scale matrix reflecting the recent language characteristic shows fewer mismatches with respect to an actual language trend. Thus, the device to personalize a speech recognition model generates the personalized speech recognition model 820 with respect to an individual user by applying a group scale matrix based on a language group of the corresponding user, without training with respect to the corresponding user. Furthermore, the device to personalize a speech recognition model generates a more personalized speech recognition model 820 with respect to the corresponding user by applying and training the user scale matrix.

In an example, the device to personalize a speech recognition model updates the personalized speech recognition model 820 to be optimized to a speech feature of an individual user each time the corresponding user uses the generated speech recognition model 820.

Further, when the group scale matrix of the personalized speech recognition model 820 is changed, the device to personalize a speech recognition model updates the user scale matrix.

Figure 9:
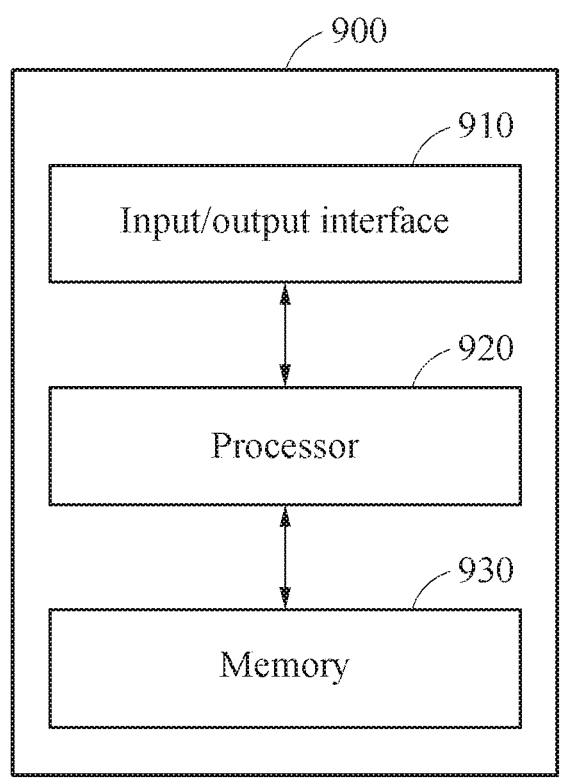
FIG. 9 is a diagram illustrating an example of a device to personalize a speech recognition model.

FIG. 9 is a diagram illustrating an example of a configuration of a device to personalize a speech recognition model.

Referring to FIG. 9, a device 900 to personalize a speech recognition model includes an input/output interface 910, a processor 920, and a memory 930.

The input/output interface 910 receives a speech of a user or an answer text or suggests a recognition result or a guide text to the user. For example, the input/output interface 910 includes a microphone to receive the speech of the user. In another example, the input/output interface 910 includes a keyboard, a touch screen or a touch pad to receive the answer text from the user. In another example, the input/output interface 910 includes a display to suggest the recognition result or the guide text. In an example, the display is a physical structure that includes one or more hardware components that provide the ability to render a user interface and/or receive user input. In an example, the display can be embedded in the device 900. In an example, the display is an external peripheral device that may be attached to and detached from the device 900. The display may be a single-screen or a multi-screen display.

The processor 920 identifies a language group corresponding to the user and generates a personalized speech recognition model by applying a group scale matrix corresponding to the identified language group to at least a portion of a plurality of layers of a speech recognition model. However, an operation of the processor 920 is not limited thereto. The processor 920 performs the operations described with reference to FIGS. 1 through 8. Further details regarding the processor 920 is provided below.

The memory 930 stores instructions to be executed by the processor 920 and the speech recognition model. The speech recognition model is a statistical speech recognition model or a neural network based speech recognition model. When the speech recognition model is a neural network, the memory 930 stores parameters such as weights of layers of the neural network. The memory 930 may store a database from which kernel elements, feature maps, weight elements, and/or voice elements may be loaded from and into the processor 920. In an example, the memory 930 may be memories of the processor 920 or buffers/memories directly connected to the processor 920, e.g., configured for rapidly transferring data to/from the processor 920 and the memory 930, noting that alternatives are also available. Further, the memory 930 stores one or more group scale matrix and a user scale matrix. Further details regarding the memory 930 is provided below.

The the device 900 to personalize a speech recognition model provides personalized speech recognition to an individual user at first using a group scale matrix corresponding to a language group of the corresponding user.

Further, the device 900 updates the group scale matrix daily or weekly to personalize a speech recognition model, thus, quickly reflecting a recent speech signal characteristic in the speech recognition model. In addition, the the device 900 to personalize a speech recognition model only needs to train several matrices, for example, vectors, and thus a time and a computation required for training are reduced.

Figure 10:
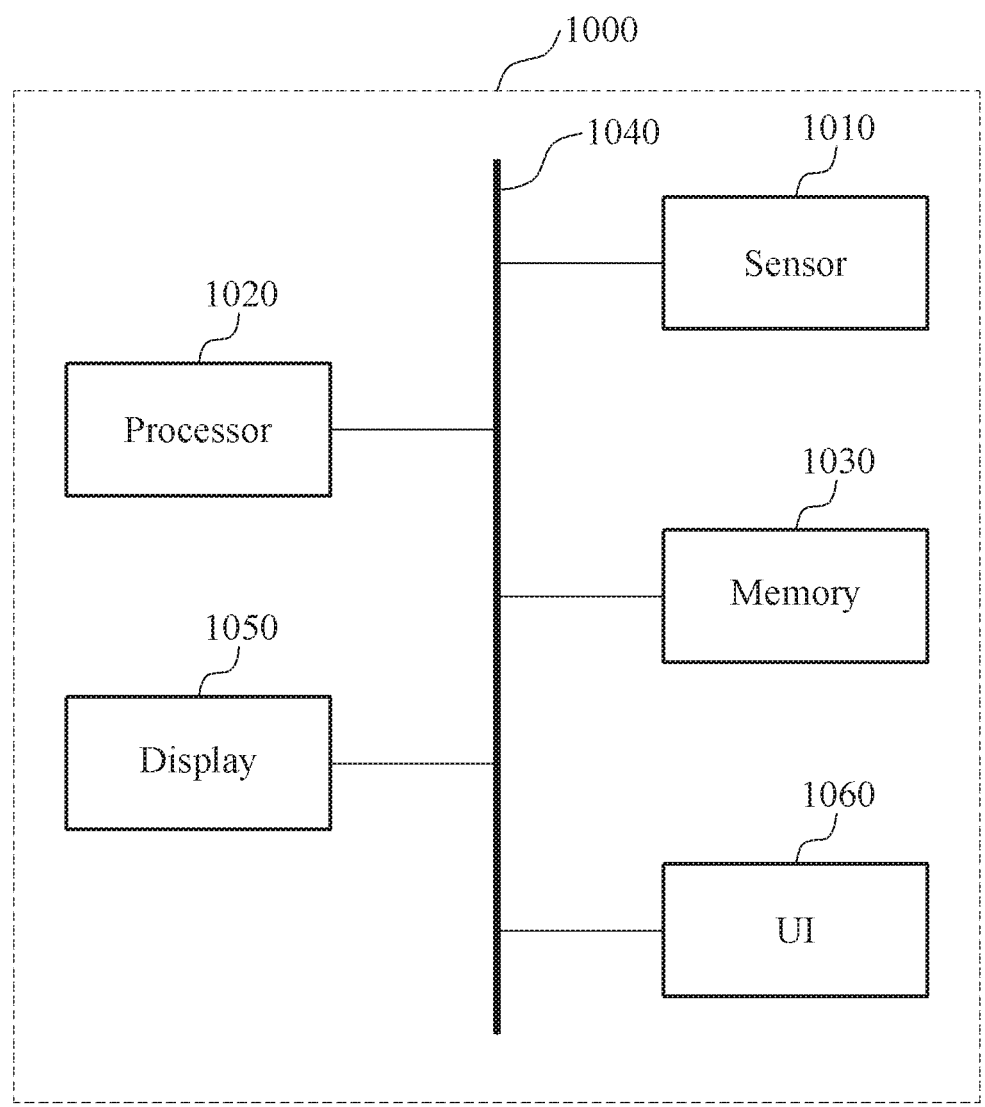
FIG. 10 is a diagram illustrating an example of an electronic device 1000 configured to implement a neural network.

FIG. 10 is a diagram illustrating an example of an electronic device 1000 configured to implement a neural network. Referring to FIG. 10, the electronic device 1000 includes a sensor 1010, a processor 1020, a local memory (not shown), a memory 1030, a display 1050, and a user interface (UI) 1060. The sensor 1010, the processor 1020, the memory 1030, the display 1050, and the UI 1060 communicate with each other via a bus 1040. The electronic device 1000 may correspond to one or more of smart phone 101, smart pad 102, speech recognition speaker 103, speech recognition TV 104, speech recognition server 130 of FIG. 1, or device 900 of FIG. 9, and may implement any one or more or all of the above processes or methods. As a non-limiting example, the processor 1020 may correspond to processor 920 of FIG. 9, and/or the memory 1030 may correspond to the memory 930 of FIG. 9. When the speech recognition model is a neural network, the memory 1030 may store a database from which kernel elements, feature maps, weight elements, voice elements, and/or image elements may be loaded from and into the local buffers/memories of the processor 1020. In an example, the local buffers/memories may be memories of the processor 1020 or buffers/memories directly connected to the processor 1020, e.g., configured for rapidly transferring data to/from the processor 1020 and the local buffers/memories, noting that alternatives are also available. The local buffers/memories may further be allocated to temporarily store convolutional output results of a particular layer of the neural network, or all layers of the neural network, the ultimate output results of which may be stored in the memory 1030 and/or respectively used for inputs to a next layer. In an example, except for purposes of an input to a next layer, the convolutional results of each layer may discarded and only final layer(s) output results of the neural network stored to the memory 1030 or used for another process, such as in cooperation with an unlocking and corresponding display operation of a mobile phone as the electronic device 1000. As also noted, the processor 1020 may represent one or more processors that are configured as any one or any combination of the above neural network processing apparatuses or translation apparatuses, as non-limiting examples.

The sensor 1010 includes, for example, a microphone and/or an image sensor or camera to sense audio data and video data to collects sounds produced by a person speaking near the electronic device 1000. An output of the sensor 1010 is transferred to the processor 1020 or the memory 1030, and output of the sensor 1010 may also be transferred directly to, or operate as, an input layer of a neural network discussed herein.

The processor 1020 may be configured to perform one or more or all processes described with reference to FIGS. 1-9. For example, to generate text data corresponding to the speech signal, the processor 1020 may recognize, reject, or verify the input data based on the neural network processing operations described above with respect to FIGS. 1-9, which efficiently processes a convolution operation in a neural network to identify the language group of the user based on language characteristic estimation information associated with the user. In another example, the processor 1020 efficiently processes a convolution operation in a neural network to personalize a speech recognition model by updating at least one of the group scale matrix and the user scale matrix through loss back-propagation learning, which may also be considered acceleration processing. The result of any of the recognition operations may be output through the display 1050. In addition, user adjustments or selective operations of the neural network processing operations discussed herein may be provided by UI 1060, which may include a touch screen or other input/output device/system. As noted above and described below, the processor 1020 may be a graphics processor unit (GPU), reconfigurable processor, or have any other type of multi- or single-processor configuration.

In addition to operations of one or more of the neural network processing apparatuses and/or operations described in FIGS. 1-10 as noted above, the memory 1030 may further store instructions which, when executed by processor 1020, cause the processor 1020 to perform additional operations, functions, and controls of the electronic device 1000, such as a user interface of the electronic device. The electronic device 1000 may be connected to an external device, for example, a personal computer (PC) or a network, via an input/output device of the electronic device, to exchange data with the external device. The electronic device 1000 may be various devices, as only non-limiting examples, a mobile device, for example, a mobile telephone, a smartphone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a high definition television (HDTV), a smart TV, a smart appliance, a smart home device, or a security device for gate control, various Internet of Things (IoT) devices, or any other device capable of wireless communication or network communication consistent with that disclosed herein.

The device 900 and electronic device 1000 to personalize a speech recognition model, and other apparatuses, units, modules, devices, and other components described herein with respect to FIGS. 9-10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method to personalize a speech recognition model, the method comprising:
    identifying a language group corresponding to a user;
    generating a personalized speech recognition model by applying a group scale matrix corresponding to the identified language group to one or more layers of a speech recognition model;
    identifying an additional language group corresponding to the user after the personalized speech recognition model is generated; and
    updating the personalized speech recognition model by applying an additional group scale matrix corresponding to the additional language group to the one or more layers.

2. The method of claim 1, wherein the identifying comprises identifying the language group of the user based on any one or any combination of a user input, position information, and language characteristic estimation information associated with the user.

3. The method of claim 1, wherein the identifying comprises identifying language groups corresponding to the user, and
    the generating comprises applying group scale matrices corresponding to the language groups to the one or more layers of the speech recognition model.

4. The method of claim 3, wherein the applying of the group scale matrices comprises applying the group scale matrices corresponding to the language groups to the one or more layers sequentially based on hierarchical positions of each of the language groups.

5. The method of claim 3, wherein the applying of the group scale matrices comprises:
    applying a first portion of the group scale matrices corresponding to a first portion of the language groups to the one or more layers; and
    applying a second portion of the group scale matrices corresponding to a second portion of the language groups to other layers of the speech recognition model.

6. The method of claim 1, wherein the generating comprises generating the personalized speech recognition model by applying the group scale matrix and a user scale matrix to the one or more layers.

7. The method of claim 6, further comprising:
    training the user scale matrix in the personalized speech recognition model based on a speech signal, in response to the speech signal being obtained from the user; and
    fixing at least one parameter while training the user scale matrix.

8. The method of claim 6, further comprising:
    updating the user scale matrix, in response to the group scale matrix of the personalized speech recognition model being changed.

9. The method of claim 6, further comprising:
    setting an initial value of the user scale matrix to be equal to a value of the group scale matrix.

10. The method of claim 1, wherein the generating comprises:
    correcting outputs of nodes included in the one or more layers by applying the group scale matrix to the outputs of the nodes in the one or more layers; and
    forwarding the corrected outputs to a subsequent layer.

11. The method of claim 1, wherein the identifying comprises identifying a language group corresponding to a current user, in response to the current user being different from a previous user.

12. The method of claim 11, wherein the identifying of the language group corresponding to the current user comprises loading a portion of group scale matrices on a language group to which the previous user belongs, and
    the generating comprises generating the personalized speech recognition model by applying the loaded portion of the group scale matrices to the speech recognition model.

13. The method of claim 1, further comprising:
recognizing a speech input of the user based on the personalized speech recognition model.

14. The method of claim 1, further comprising:
collecting training data from a plurality of users corresponding to a target language group among language groups for a period of time; and
training a group scale matrix corresponding to the target language group based on the training data.

15. The method of claim 14, wherein the training comprises training a group scale matrix of a higher hierarchical level than the group scale matrix corresponding to the target language group.

16. The method of claim 1, wherein the generating comprises limiting each of outputs of the at least a portion of the layers to which the group scale matrix is applied to a range.

17. The method of claim 1, wherein the one or more layers comprises a layer designated for a language of the user, among layers of the speech recognition model.

18. The method of claim 1, wherein the generating comprises applying the group scale matrix to a layer to which the group scale matrix is applied with respect to a previous user, in response to the previous user being identical to a current user.

19. The method of claim 1, wherein the language group comprises any one or any combination of a ethnic-based group, region-based group, age-based group, dialect-based group, and gender-based group.

20. A non-transitory computer-readable storage medium storing instructions that, when executed by a processor, cause the processor to perform the method of claim 1.

21. A device to personalize a speech recognition model, the device comprising,
a processor configured to
identify a language group corresponding to a user, and
generate a personalized speech recognition model by applying a group scale matrix corresponding to the identified language group to one or more layers of a speech recognition model;
identify an additional language group corresponding to the user after the personalized speech recognition model is generated; and
update the personalized speech recognition model by applying an additional group scale matrix corresponding to the additional language group to the one or more layers.

22. An electronic device, comprising:
a sensor configured to sense a voice signal;
a memory configured to store a personalized speech recognition model and instructions; and
a processor configured to execute the instructions to:
identify a language group corresponding to a user,
generate the personalized speech recognition model by applying a group scale matrix corresponding to the identified language group to one or more layers of a speech recognition model,
identify an additional language group corresponding to the user after the personalized speech recognition model is generated,
update the personalized speech recognition model by applying an additional group scale matrix corresponding to the additional language group to the one or more layers,
recognize the voice signal based on the personalized speech recognition model, and
generate a textual string based on the recognized voice signal.

23. The device of claim 22, wherein:
the sensor is further configured to detect position information a user;
the memory is further configured to store the positional information; and
the processor is further configured to periodically update the personalized speech recognition model based on the stored positional information.

* * * * *